Feb. 15, 1966 E. B. HOFFMAN ETAL 3,235,637
PROCESS FOR MOLDING POLYMERS OF HALOHYDROCARBONS
Filed March 9, 1964
2 Sheets-Sheet 1

INVENTORS
EDWIN B. HOFFMAN
DAVID C. TRIMBLE
WALTER O. WEBER
BY Cushman, Darby & Cushman
ATTORNEYS Feb. 15, 1966  E. B. HOFFMAN ETAL  3,235,637
PROCESS FOR MOLDING POLYMERS OF HALOHYDROCARBONS
Filed March 9, 1964  2 Sheets-Sheet 2

INVENTORS
EDWIN B. HOFFMAN
DAVID C. TRIMBLE
WALTER O. WEBER

BY Cushman, Darby & Cushman
ATTORNEYS

United States Patent Office 3,235,637
Patented Feb. 15, 1966

3,235,637
PROCESS FOR MOLDING POLYMERS OF
HALOHYDROCARBONS
Edwin B. Hoffman, Wilmington, David C. Trimble, Yorklyn, and Walter O. Weber, Newark, Del., assignors to Haveg Industries, Inc., a wholly owned subsidiary of Hercules Powder Company, New Castle, Del., a corporation of Delaware
Filed Mar. 9, 1964, Ser. No. 350,505
15 Claims. (Cl. 264—87)

The present invention relates to the preparation of molded polymers of halohydrocarbons. More particularly, this invention relates to molding a shaped article of substantially uniform density from a halohydrocarbon such as polytetrafluoroethylene, hereinafter sometimes referred to as Teflon.

It has been known to mold Teflon, e.g. as a covering for magnet wire, by coating out of an aqueous dispersion. However, if it is coated out too thick, cracking occurs. Consequently, it is necessary to use multiple passes and sinter the coated layer between each pass. Even with multiple passes, the upper limit of thickness possible is 20 to 30 mils (with 0.5 to 1.5 mils being applied per pass).

Teflon has sensitive surface characteristics. For example, the surface of individual particles cannot be wiped without their losing ability to stick to one another.

It has been proposed in the United States patent to Alethan, No. 2,440,190, to form a slurry of finely divided polytetrafluoroethylene in a volatile liquid dispersant inert to and capable of wetting the polytetrafluoroethylene, sedimenting a layer of the polytetrafluoroethylene from the slurry, e.g. on a muslin filter, removing the excess liquid dispersant, pressing the polytetrafluoroethylene layer at a pressure of at least 50 p.s.i. releasing the pressure, seasoning the polymer and sintering the polytetrafluoroethylene at a temperature above 327° C. By this procedure, flat sheets are produced having a maximum thickness prior to compressing (and sintering) of up to 26 mils (Example IV) and after compressing (and sintering) 24 mils (Example III). To obtain greater thickness, it was necessary to weld a plurality of sheets together (Example III). This procedure has the disadvantage that in order to make shapes other than flat sheets, further working is required, as seen in United State Patent No. 2,997,445 to Hochberg.

Other molding procedures for polytetrafluoroethylene are disclosed, for example, in the United States patents to Cresap, No. 2,929,109, and Squires et al., No. 2,710,991.

It has also been proposed in copending United States applications Serial Nos. 272,469, and 305,007 to David C. Trimble to vacuum mold polytetrafluoroethylene from a slurry of the same utilizing a mold of the desired configuration. In place of vacuum molding, there can be imparted a pressure to the polytetrafluoroethylene slurry in order to mold the polymer. The molded product is then sintered at a temperature of above 327° C., e.g. 350° C., 380° C. or 400° C. Usually, the sintering temperature does not exceed 500° C. The molded product is not fully cohered prior to sintering and is porous in nature. Consequently, it normally shrinks, e.g. to about 75% of its original size in the sintering operation. While polytetrafluoroethylene has a density of 2.2, the products of the aforementioned copending applications, utilizing polytetrafluoroethylene, have an apparent density of 1.5 to 2.0 without pressuring, while, with compacting, it can be configured to shape at its full density of 2.2.

In order to make a more dense article, there may be employed a hydroclave container and articles produced, e.g. by vacuum molding, are removed from the mold and placed, e.g. in a polyethylene bag. Liquid is then pumped into the hydroclave to impart a pressure of from 250 p.s.i. to 5000 p.s.i. to densify the molded article which is then removed from the hydroclave and sintered.

While the above method is a distinct advance in the art of molding polymers of halohydrocarbons, several disadvantages still remain. For example, use of the plastic bag inhibits exertion of true "hydraulic" pressure distribution to the material of the part being treated. Furthermore, proper positioning and fitting of the bag around the part has great effect on the quality of the completed part. This most difficult portion of the bagging technique is both tedious and time-consuming. The process also requires frequent handling of the compacted material with danger to fragile items. For example, the molded article must be removed from the molding chamber to an oven or other heating device in order to sinter the same into a self-sustaining form.

It is therefore an object of the present invention to provide a novel method for obtaining molded and compacted products from halogenated hydrocarbon polymers containing fluorine as the predominating halogen.

An additional object of the present invention is to provide pressuring technique for compacting articles of polytetrafluoroethylene and other halogenated hydrocarbon polymers containing fluorine as the predominating halogen.

It is another object of the present invention to provide such a technique whereby true "hydraulic" pressures distribution may be exerted on the part resulting in smooth, uniform compaction.

It is still another object of the present invention to provide such a technique whereby the polymers may be molded, compacted and sintered without the need for intermediate handling.

It is a further object of the present invention to provide such a technique which requires little or no preparation time and which is simple and economical to execute.

A further object of the present invention is to provide polytetrafluoroethylene objects which can be non-uniform in thickness and which can be of any desired configuration.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by molding a halohydrocarbon polymer, e.g. by any known method. Preferably, the polymer is molded from a slurry of the same utilizing vacuum molding techniques. The incompletely compacted article is retained on the porous substrate upon which it was formed and the remaining portion of the carrier solution is dried off. The dried article is then immersed in a nonpenetrating liquid medium contained within a pressure vessel suitable for application of claving pressures. A vacuum is drawn on the substrate while the entire exposed surface of the article retained thereon is covered with the liquid which is forced into the vessel by a high pressure pump. After holding under pressure for a desired time, the article may be removed and later sintered in an oven. Alternatively, the article may be sintered in the pressure vessel by applying a proper temperature cycle to the nonpenetrating liquid.

It has been found possible, according to the invention, to build up sections of polymer, e.g. polytetrafluoroethylene, as thick as 100 mils, 1 inch (1000 mils), or more, using the invention without getting mud cracking or other undesirable properties nor is there a need to resort to multiple dips with sintering after each dip. As in the aforementioned copending applications, special areas can have a build up of extra amounts of polytetrafluoroethylene either by controlling the level of the slurry, e.g. tilting the mold with the mixture in it or by applying a greater vacuum to the special areas than in other areas or otherwire exposing some areas to greater concentration of polymer than other areas.

The invention will be best understood in connection with the drawings, wherein.

Figure 1:
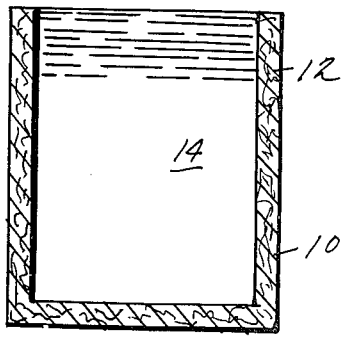
FIGURE 1 is a vertical section of a mold containing a polytetrafluoroethylene slurry.

Referring more specifically to FIGURE 1 there is provided a female mold 10 formed of salt and having micropores 12 dispersed therethrough. Instead of employing a salt mold, there can be employed any other mold having fine interconnecting pores dispersed therethrough, which mold is insoluble in the liquid dispersant for polytetrafluoroethylene used and which will withstand the sintering temperature if used as a supporting member during the sintering operation. Thus, the mold can be made of microporous sand or a microporous thermoset synthetic resin, such as phenol formaldehyde, melamine formaldehyde, urea-formaldehyde, alkyd resin, epoxy resin, e.g. bisphenol A-epichlorohydrin resin, porous carborundum, porous glass, porous ceramic material, or porous metal, compacted corundum, compacted granular quartz, resin bonded sand, e.g., phenol-formaldehyde bonded sand.

Into mold 10 is placed a dispersion 14, e.g. of a slurry of 2½ pounds micropulverized polytetrafluoroethylene and 4½ gallons perchloroethylene.

Figure 2:
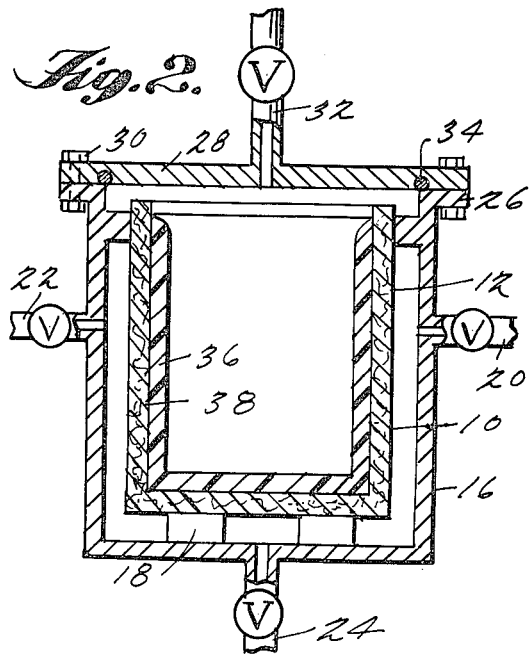
FIGURE 2 is a vertical section of a mold similar to that of FIGURE 1 after application of vacuum and deposition of the polytetrafluoroethylene layer, illustrating application of pressure to said layer.

In FIGURE 2 female mold 10 is shown supported in vacuum chamber 16 on rings 18. Chamber 16 is provided with valved lines 20, 22 and 24 for application of vacuum to remove liquid from the dispersion, and with flange ring 26 upon which is mounted cover 28 secured by bolts 30. Cover 28 is provided with valved line 32 and O-ring seal 34.

In a specific example using the apparatus of FIGURE 2, a solid layer of polytetrafluoroethylene was deposited as cut 36 on the inner wall 38 of mold 10 from a slurry of 2½ pounds micropulverized polymer in 4½ gallons perchloroethylene. The vacuum applied was one of 25" Hg (i.e. a pressure of 4.92" Hg) although this can be varied to give a pressure as low as 0.5" Hg or less, e.g. 0.039" Hg or as high as 15.6 Hg or somewhat higher. Cup 36 and mold 10 were dried by introducing air through line 32 and drawing off vapors through lines 20, 22 and 24. To hasten drying, the air may be heated. Drying may also be accomplished by placing open mold 10 and cup 36 in a heated oven (not shown) and allowing adhering slurry liquid to vaporize. After the drying step, the valve in line 32 was closed and a vacuum of 25" Hg drawn on the interior of chamber 16. As above, pressures may range between about 0.5" Hg and 15.6 Hg.

The valves in lines 20, 22 and 24 were then closed to maintain the reduced pressure in chamber 16. The chamber was then heated to a temperature of 350° F. and a non-penetrating liquid, e.g. "Cerrobase" low-melting alloy also at a temperature of 350° F., was introduced through line 32. After chamber 16 was filled with the liquid, pressure was applied thereto by means not shown. Pressures of from 2000 to 5000 p.s.i. were applied (the average was 3000 p.s.i.) for 15 minutes. The liquid medium was expelled from chamber 16; cup 36 and mold 10 were removed from chamber 16 as a unit and placed upsidedown on a screen in an oven. The assembly was dried and sintered for a total of 17 hours. During the first 6 hours, the temperature was raised from 350° F. (i.e. 177° C.) to 720° F. (382° C.) and held at this temperature for 11 hours prior to quench. A substantial amount of Cerrobase was released from the assembly. Mold 10 was separated from cup 36 and was still completely impregnated with Cerrobase. Cup 36, however, had only a very little Cerrobase adhering thereto and there was no evidence of any penetration into the Teflon. Density of the cup was 2.15 compared to 2.2 for the polytetrafluoroethylene from which it was derived.

Prior to compaction and sintering, cup 36 measured 1.25 inches in outer diameter and 1.438 inches in length. After sintering and while separating the cup from the mold, cup 36 appeared to be raised from the bottom of the mold approximately 3/16 inch and sides of the cup were spaced from 1/16 to 5/32 inch from the sides of mold 10. Actual measurements revealed that the cup was reduced to an outer diameter of 1.08 inches at the top and 1 inch at the bottom. The length of the cup was also reduced 1 inch. The cup was reduced to about 75% of its original size due to mold 10 permitting easy passage of the pressurizing liquid medium therethrough.

While normally there is employed a slurry of 15% of polytetrafluoroethylene in perchloroethylene, kerosene or Varnish Makers and Painters Naphtha, there can be employed other liquid dispersants inert to and capable of wetting polytetrafluoroethylene and which boil below 327° C., e.g. hexane, n-heptane, pinene, ethyl alcohol, acetone, isopropyl alcohol, methyl alcohol, diethyl ether, ethyl acetate, dibutyl phthalate, triethanolamine, etc.

In the preceding example, the pressurizing liquid medium used was Cerrobase, a low-melting metallic alloy of 55.5% bismuth and 44.5% lead (eutectic mixture). Other non-penetrating liquids of a similar nature may be used, such as Wood's metal, solder, Rose metal, and the like, i.e., metals and alloys thereof which are liquid and have suitable surface wetting properties at the temperatures used. These are preferred although non-metallic liquids such as high melting point wax, carbowax and low melting point salts may be used. When using a molten salt with a salt mold, precautions may be necessary to prevent the pressurizing salt from contacting the mold.

While in the example the Cerrobase and chamber 16 were heated to 350° F. prior to the pressurizing step, temperatures between the melting point of the liquid used and up to about 550° F. (about 290° C.) are suitable. Pressures in chamber 16 may range from 250 p.s.i. to 5000 p.s.i. or higher. Usually, the average pressure is between 1000 p.s.i. and 4000 p.s.i. Sintering may be conducted at a temperature of above 327° C., e.g. at 350° C., 380° C. or 400° C. Usually, the sintering temperature does not exceed 500° C.

It will also be seen that in using the apparatus of FIGURE 2, the molding, compacting and sintering may be carried out without handling or moving the article. That is instead of expelling the pressurizing liquid medium following the compacting step, temperature of the same may be raised to the sintering temperature, e.g. above 327° C., and held for the required amount of time.

As the non-penetrating liquid, as stated, there are preferably used metals in admixture, e.g., as an alloy or as an eutectic mixture or the metals alone. Also, as stated, it is essential that the material be liquid at the temperature at which it is used. Normally, the only critical temperature for the metal or alloy is its melting point since its boiling point is usually well above temperature to which it will be subjected in the process of the invention, even if the liquid is further heated to effect sintering of the compacted part.

For convenience there is included in the following Table I a comparison between temperatures on the Fahrenheit and centigrade scales:

TABLE I

| °F. | °C. |
|---|---|
| 100 | 38 |
| 200 | 93 |
| 350 | 177 |
| 554 | 290 |
| 621 | 327 |
| 667 | 350 |
| 716 | 380 |
| 752 | 400 |
| 932 | 500 |

Using the above temperature chart as a guide, it will be evident as to which liquids are suitable for any particular pressurizing and sintering temperature.

Illustrative alloys, metals and mixtures of metals are given in Tables II and III.

TABLE II

| Metal: | M.P. (°C.) |
|---|---|
| Mercury | −40 |
| Gallium | 29 |
| Indium | 156 |
| 50% Bi, 25% Pb, 12.5% Sn, 12.5% Cd (Wood's metal) | 70 |
| 53% Bi, 32% Pb, 15% Sn | 96 |
| 52% Bi, 40% Pb, 8% Cd | 91.5 |
| 50% Bi, 27% Pb, 13% Sn, 10% Cd (Lipowitz alloy) | 70–4 |
| 40% Bi, 40% Pb, 20% Sn | 111 |
| 54% Bi, 26% Sn, 20% Cd | 103 |
| 80% Hg, 20% Bi | 90 |
| 68% Sn, 32% Cd | 180 |
| 67% Sn, 33% Pb (solder) | 180 |
| 50% Sn, 32% Pb, 18% Cd | 145 |
| 49.9% Bi, 43.4% Pb, 6.7% Cd | 95 |
| 50.1% Bi, 24.9% Pb, 14.2% Sn, 10.8% Cd | 66 |
| 56% Bi, 22% Pb, 22% Sn | 105 |
| 53.1% Bi, 22.1% Pb, 24.8% Sn | 121 |
| Bismuth-cadmium eutectic | 146 |
| Tin | 232 |
| Bismuth | 271 |
| 50% Pb, 50% Sn | 225 |
| Antimony-lead eutectic | 246 |
| 90% Pb, 10% Sb | 270 |
| 85% Pb, 15% Sb | 250 |
| 75% Pb, 19% Sb, 5% Sn, 1% Cu | 238 |
| 67% Pb, 33% Sn | 275 |
| 90% Sn, 10% Sb | 255 |
| 75% Sn, 12.5% Sb, 12.5% Cu | 233 |

TABLE III

| Metals | Percent of Second Named Metal | | | | | | | | |
|---|---|---|---|---|---|---|---|---|---|
| | 10 | 20 | 30 | 40 | 50 | 60 | 70 | 80 | 90 |
| | Temperatures in °C. | | | | | | | | |
| Pb-Sn | | 276 | 262 | 240 | 220 | 190 | 185 | 200 | 216 |
| Pb-Bi | 290 | | | 179 | 145 | 126 | 168 | 205 | |
| Pb-Sb | 250 | 275 | | | | | | | |
| Sb-Sn | | | | | | | | | 255 |
| Cd-Ti | | 285 | 270 | 262 | 258 | 245 | 230 | 210 | 235 |
| Cd-Zn | 280 | 270 | | | | | | | |

Illustrative salts (including eutectic mixtures) are given in Table IV.

TABLE IV

| Salt | M.P. (°C.) | B.P. (°C.) |
|---|---|---|
| AlI₃ | 191 | 360 |
| SbI₅ | 167 | 401 |
| AsI₅ | 146 | 403 |
| BiBr₃ | 218 | 453 |
| Cs₂S₃ | 217 | 780 |
| InBr | 220 | ¹ 662 |
| InCl | 225 | 550 |
| NbBr₅ | 150 | 361.6 |
| KCr(SO₄)₂.12H₂O | 89 | ² 400 |
| K₂S₄ | 145 | ³ 850 |
| KSON | 173 | ³ 500 |
| NaNH₂ | 210 | 400 |
| TiI₄ | 150 | >360 |
| SnBr₂ | 215 | 620 |
| NH₄F | 213 | |
| CsBr₃ | 180 | |
| K₂S₃ | 252 | |
| SnCl₂ | 246 | 623 |
| ZnCl₂ | 262 | 732 |

¹ Sublimes.
² −12H₂O.
³ Decomposes.

Figure 3:
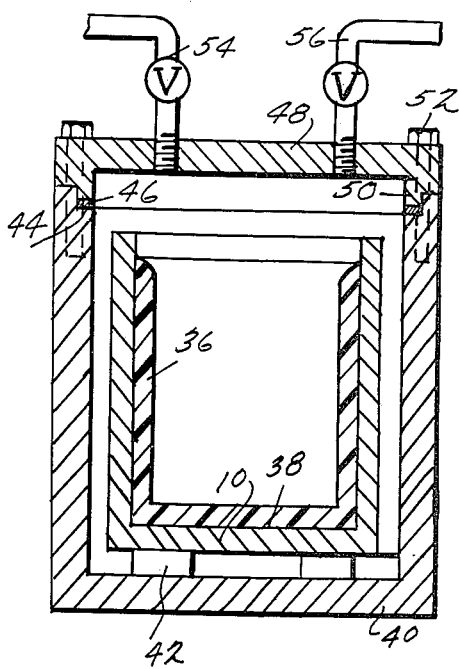
FIGURE 3 is a vertical elevation of a modified mold similar to that of FIGURE 2 after deposition of the polytetrafluoroethylene layer.

In FIGURE 3, a modified mold similar to that shown in FIGURE 2 is illustrated. In FIGURE 3, cup 36 is deposited on the inner wall 38 of salt mold 10. The mold is supported in chamber 40 on rings 42. Chamber 40 is provided with shoulder 44 upon which rests gasket 46. Cover 48 carries flange 50 which rests on gasket 46 and is secured to chamber 40 by bolts 52. Cover 48 is also provided with valved lines 54 and 56; line 54 serves as a high pressure source while line 56 leads to a vacuum source not shown. This apparatus may be used in a manner similar to that of FIGURE 2. Thus, mold 10 and cup 36, previously dried are placed in chamber 40 on rings 42 and cover 48 secured with bolts 52. The valve in line 54 is closed and a vacuum of 25″ Hg drawn on the interior of chamber 40; the valve in line 56 is then closed to maintain the reduced pressure. The chamber is preferably heated to about 350° F. and Cerrobase at about the same temperature was introduced through line 54. Any desired pressure within the range noted above may be applied for a suitable time after which cup 36 is removed from chamber 40 and sintered. The results are similar to those described with the apparatus of FIGURE 2.

Figure 4:
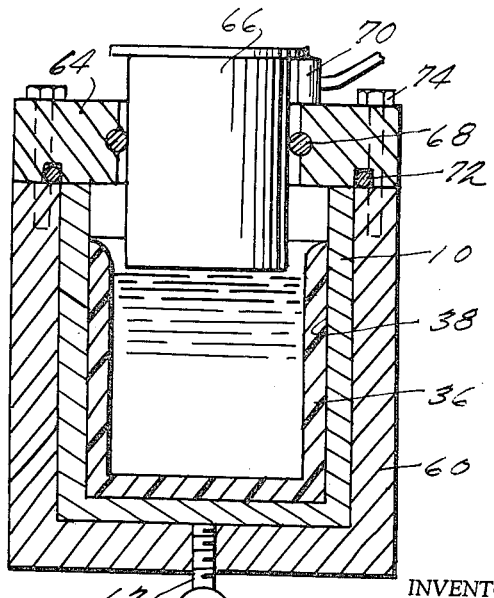
FIGURE 4 is a vertical section of an apparatus illustrating pressurizing of a molded polytetrafluoroethylene article.

Referring now to FIGURE 4, dried cup 36, deposited on inner wall 38 of mold 10, is placed into chamber 60 constructed to permit pressurizing of cup 36 by the displacement method. The chamber is fitted with valved line 62 and cover 64 carries piston 66 sealed therein by O-ring seal 68. As shown in FIGURE 4, piston 66 is held in the withdrawn position by means of piston lock 70. Cover 64 is fitted with O-ring seal 72 and secured to chamber 60 by means of bolts 74.

In use, cup 36 is filled with Cerrobase or other non-penetrating liquid. The valve in line 62 is opened and a vacuum drawn on the interior of chamber 60. The valve is then closed to maintain the reduced pressure. Piston lock 70 is now disengaged and pressure applied to piston 66 by means not shown. The pressure is exerted through the non-penetrating liquid producing complete envelopment of cup 36 and subsequent compaction thereof. After a suitable time, pressure is released and cup 36 removed from chamber 60 and sintered.

In the embodiments illustrated in FIGURES 1–4, it will be seen that due to the porous nature of mold 10, the non-penetrating liquid exerts pressure on both sides of cup 36, resulting in a reduction in size thereof. Oftentimes, it is more desirable to retain substantially the dimensions of a part as deposited on a mold. This is accomplished by subjecting one side only of the part to liquid pressure. In this way, the wall thickness of the part is reduced leaving the other dimensions substantially the same as when deposited on the mold. Apparatus for achieving this type of compaction is shown in FIGURES 5 and 6.

Figure 5:
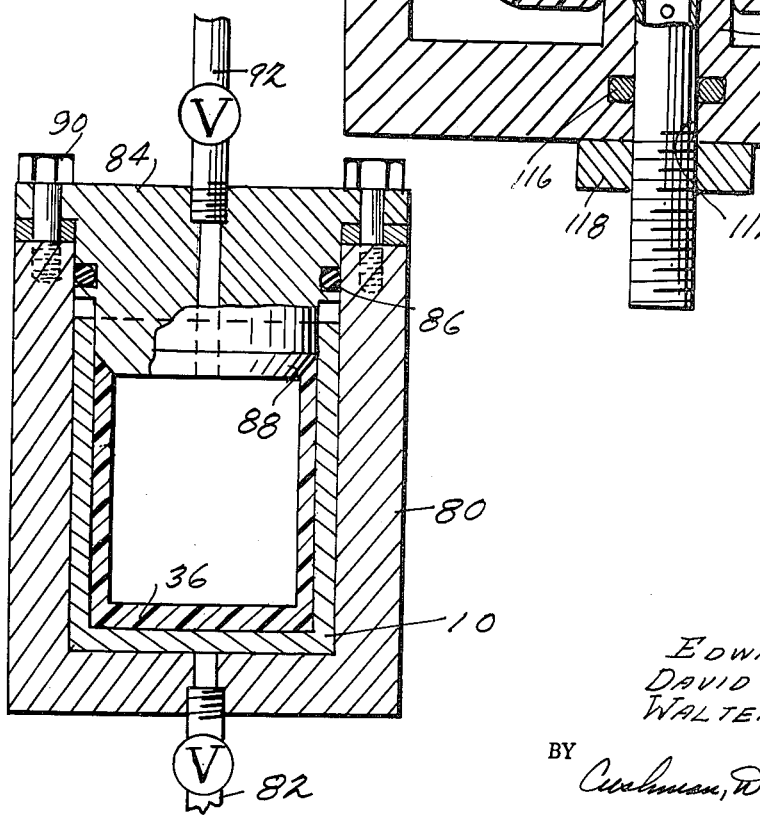
FIGURE 5 is a vertical section of an apparatus containing a mold after deposition of a polytetrafluoroethylene layer and illustrating application of pressure to one side only of said layer.

Referring now particularly to FIGURE 5, female mold 10 having cup 36 deposited therein is place in chamber 80 provided with valved line 82. Pressure cover 84 is fitted within the chamber and carries O-ring seal 86. Cover 84 includes beveled cap 88 which contacts cup 36 and is secured to chamber 80 by means of bolts 90. These are tightened until the seal between cap 88 and the portion of cup 36 contacted thereby is of sufficient strength that it will be maintained during the pressurizing step. Cover 84 is also provided with valved line 92.

In operation, the valve in line 92 is closed and a vacuum drawn through line 82 after which the valve therein is closed to maintain the reduced pressure. Non-penetrating liquid is admitted through line 92. After treatment at a suitable pressure for the required amount of time for compaction, cup 36 is removed and sintered.

Figure 6:
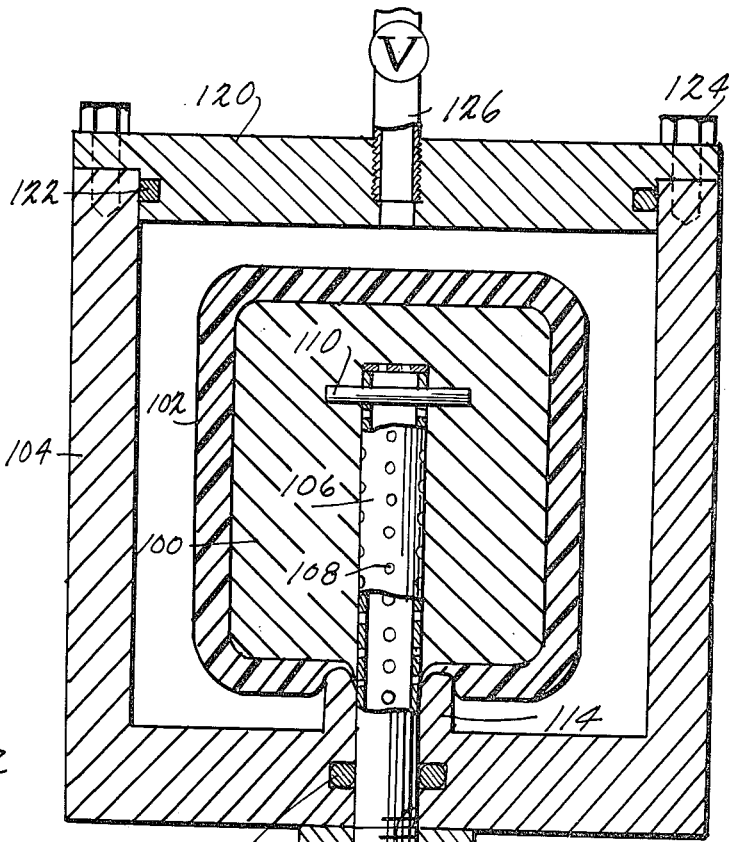
FIGURE 6 is a vertical section of an apparatus illustrating pressurizing of one side only of a molded polytetrafluoroethylene article.

In the embodiment shown in FIGURE 6, male mold 100 having part 102 deposited thereon is placed in chamber 104. Mold 100 is formed of a dissolvable material, e.g. salt, and is formed around hollow tube 106 having radial perforations 108 and a slip-out cross-arm pin 110 in the portion embedded in the mold. The bottom of chamber 104 contains an opening 112 surrounded by boss 114 extending into the interior of the chamber. The free end of tube 106 is inserted in boss 114 and is sealed in opening 112 by means of O-ring seal 116 located in the bottom of chamber 104 and seal retaining nut 118 applied to the exterior of the vessel. Tube 106 is connected by means not shown to a vacuum source, also not shown. Boss 114 engages and compacts a portion of part 102 forming a seal which is maintained during the pressurizing phase. Cover 120 carries O-ring seal 122 and secured to chamber 104 by means of bolts 124. Cover 120 is also provided with valved line 126 which serves as a liquid feed and high pressure source.

In operation, the valve in line 126 is closed and a vacuum drawn and maintained through tube 106. Non-penetrating liquid is admitted through line 126 at a pressure held for a suitable time for compaction. Part 102 may then be removed and sintered.

In FIGURE 6, male mold 100 is shown formed of a dissolvable material, e.g. salt. Alternatively, the porous mold may be formed of fine mesh screens supported on perforated plates. For example, screening of 200 mesh or finer is fabricated to the shape of the object to be plated and supported on coarser, e.g. 80 mesh, screening. This preform is in turn supported on heavier plate, e.g. about ¼ inch thick, having perforations of about ⅛ inch in diameter. The Teflon is deposited on the fine screen. After compaction and sintering, the mold is disassembled and removed from the completed part.

In the embodiments shown in FIGURES 5 and 6, the vacuum source may be maintained during pressurizing. In this way and by slowly applying the pressure, removal of residual slurry liquid from the deposited part may be accomplished simultaneously with the pressureizing. In all of the embodiments shown, sintering of the compacted part may be carried out in situ if desired. This is accomplished by raising the temperature of the non-penetrating liquid to sintering temperature and holding for the required amount of time.

The process of the present invention can be used to mold irregular shapes for which conventional Teflon molding procedures are unsuitable. As seen, the process can be carried out by forming the polytetrafluoroethylene product around either a male or female mold.

The amount of shrinking during sintering will depend, to some extent, on how porous the product is, i.e. on the amount of prior compaction. The product can shrink, for example, to a size which is 65 to 95% of the original size. In cases of extreme compaction, essentially no shrinkage, or even a slight growth may be observed.

For best results, the porous support employed in the process of the present invention has the following characteristics.

(1) It should have rigidity and dimensional stability (with the aid of the supporting perforated plate, if one is employed) under the conditions of filtration and sintering.

(2) It should have a sufficiently smooth surface to provide a satisfactory finish to the Teflon part when it is desired to have a smooth finish on the part.

(3) It should have sufficient porosity to permit good drainage of the suspending liquid and avoid undue pressure drop in the flow thereof through it.

(4) The pores should be sufficiently small that the Teflon itself does not enter them. A suitable example of a satisfactory mold is 120 to 150 mesh (U.S. Standard Sieve) Ottawa sand bonded with 5% of a shell-type phenol-formaldehyde resin.

While the present invention is primarily useful in the molding of polytetrafluoroethylene, it is suitable for molding other fluorinated polymers, such as a copolymer of tetrafluoroethylene with 5–50% of hexafluoropropene, vinyl fluoride or vinylidene fluoride (e.g. 80% tetrafluoroethylene, 20% hexafluoropropene copolymer) or polyvinyl fluoride, polyhexafluoropropene, polymonochlorotrifluoroethylene, copolymer of 70–30% vinylidene fluoride and 30–70% hexafluoropropene (e.g. 50% vinylidene fluoride–50% hexafluoropropene copolymer). There can be employed other perfluorocarbon polymers, such as those disclosed in Bro et al. Patent No. 2,946,763, Mallouk et al. Patent No. 2,955,099, Bro et at. Patent No. 2,988,-542, Coffman Patent No. 3,047,553 and Schreyer Patent No. 3,085,083. Illustrative of such polymers are tetrafluoroethylene-hexafluoropropylene copolymers having weight ratios of 75:25 or 30:70 or 34:66, or 19:90 or 1:2 or 4:3 or 23.8:30 or 85:15 and a copolymer of hexafluoropropylene and vinylidene fluoride (7.5:3.2).

The invention is particularly valuable, as indicated, in molding non-planar shaped articles and articles having substantial thickness.

To prevent excess material forming in the lower portion of the mold, e.g. using the mold and liquid loading shown in FIGURES 1 and 2, sufficiently higher vacuum can be employed in the upper areas of the mold to compensate for the shorter time of contact with the slurry of Teflon. The degree of vacuum can be varied either by deliberately applying a higher vacuum in the desired areas which will contact the slurry for the shortest period of time or by constructing the mold of a varied degree of porosity, the mold being most porous in those areas which the slurry will contact for the shortest period of time. Thus, in making a cup 36 of uniform thickness, there can be employed a mold 10 in which the porosity is gradually decreased from the top to the bottom of the mold while a constant degree of vacuum is maintained during the shaping operation.

A uniform thickness of the shaped article can also be maintained by continuously replenishing the supply of Teflon slurry during the vacuum molding step and pouring the excess slurry out of the mold after shutting off the vacuum.

It will be appreciated that the height of the slurry in the mold can be maintained constant during the vacuum treatment and articles having different thickness in different portions can be obtained by varying the degree of vacuum or varying the porosity of the mold in the manner previously indicated.

While it is preferable to retain the molded piece in the porous mold during sintering, this is not essential, but instead, the piece can be removed from the slurry-forming mold and placed on some other type of support during sintering. Thus, the piece could be removed from the mold and placed on a flat piece of metal or upon another support, e.g. a solid male mold.

In forming the object in the porous mold it is frequently advantageous to rotate the mold during pouring of the Teflon slurry on the surface to insure a uniform product. Alternatively, the Teflon slurry can be applied to the mold by a rotating spray and allowing the liquid to drain through between the time that any given point on the mold receives successive spray treatments.

In the pressure molding procedure build up in different areas can be regulated in the same manner as in the vacuum molding procedure, e.g. by varying the degree of porosity of the mold or by tilting the mold.

In referring to superatmospheric pressures the pressures are normally gauge pressures. Thus, a superatmospheric pressure of 1 atmosphere is a gauge pressure of 14.7 p.s.i. (i.e., 2 atmospheres absolute pressure).

What is claimed is:

1. A process of molding a dense shaped article from a polymeric halohydrocarbon selected from the group consisting of polytetrafluoroethylene, polymonochlorotrifluoroethylene, polyvinyl fluoride, polyvinylidene fluoride, polyhexafluoropropene, copolymers of tetrafluoroethylene with a member of the group consisting of hexafluoropropene, vinyl fluoride and vinylidene fluoride and a copolymer of hexafluoropropene with vinyl fluoride, said process comprising depositing the polymeric halohydrocarbon from a slurry in a liquid dispersant onto a porous mold, placing the deposited polymeric halohydrocarbon under a pressure of at least 250 p.s.i. exerted by means of a nonpenetrating liquid to compact the same, and heating the compacted polymeric halohydrocarbon to the fusion point of the polymer to form an integral article.

2. The process according to claim 1 wherein said liquid dispersant is inert to and capable of wetting said polymeric halohydrocarbon and is vaporizable at a temperature below the fusion point thereof.

3. The process according to claim 1 wherein the compacting pressure is between 250 p.s.i. and about 5000 p.s.i.

4. The process according to claim 1 wherein the compacting pressure is between 1000 p.s.i. to 4000

5. The process of claim 1 wherein said polymeric halohydrocarbon is polytetrafluoroethylene.

6. A process according to claim 1 wherein the article has an inner surface and an outer surface and the compacting pressure is exerted only one of said surfaces.

7. A process according to claim 1 wherein the polymeric halohydrocarbon is maintained conformed to said mold until after fusion of the halohydrocarbon.

8. A process according to claim 1 wherein after compaction of the polymeric halohydrocarbon the temperature of the non-penetrating liquid is raised to above the fusion temperature of the halohydrocarbon to form the integral article.

9. The process according to claim 1 wherein said liquid dispersant and said non-penetrating liquid are different liquids.

10. A process of molding a dense shaped article from polytetrafluoroethylene which comprises depositing the polytetrafluoroethylene from a slurry in a liquid dispersant onto a porous mold, contacting the surface of the deposited polytetrafluoroethylene with a nonpenetrating liquid, subjecting said non-penetrating liquid to a pressure of at least 250 p.s.i. to compact said deposited polytetrafluoroethylene, and heating the compacted polytetrafluoroethylene, to a temperature of about 327° C. to form a sintered article.

11. A process of molding a dense shaped article from a polymeric halohydrocarbon selected from the group consisting of polytetrafluoroethylene, polymonochlorotrifluoroethylene, polyvinyl fluoride, polyvinylidene fluoride, polyhexafluoropropene, copolymers of tetrafluoroethylene with a member of the group consisting of hexafluoropropene, vinyl fluoride and vinylidene fluoride and a copolymer of hexafluoropropene with vinyl fluoride, said process comprising depositing a slurry of about 15% of said halohydrocarbon in an organic liquid dispersant on a porous mold, subjecting the deposited polymeric halohydrocarbon to a vacuum, thereby removing most of said organic dispersant, placing the deposited polymeric halohydrocarbon under a pressure of at least 250 p.s.i., applied by a non-penetrating liquid to the surface of said deposited polymeric halohydrocarbon to compact the same, and heating the compacted polymeric halohydrocarbon to the fusion point of the polymer to form an integral article.

12. The process according to claim 11 wherein said liquid dispersant is inert to and capable of wetting said polymeric halohydrocarbon and is vaporizable at a temperature below the fusion point thereof.

13. The process according to claim 11 wherein the compacting pressure is between 1000 p.s.i to 4000 p.s.i 14. The process of claim 11 wherein said polymeric halohydrocarbon is polytetrafluoroethylene.

15. A process of molding a dense shaped article from a polymeric halohydrocarbon selected from the group consisting of polytetrafluoroethylene, polymonochlorotrifluoroethylene, polyvinyl fluoride, polyvinylidene fluoride, polyhexafluoropropene, copolymers of tetrafluoroethylene with a member of the group consisting of hexafluoropropene, vinyl fluoride and vinylidene fluoride and a copolymer of hexafluoropropene with vinyl fluoride, said process comprising conforming the polymeric halohydrocarbon to a porous mold by depositing said polymeric halohydrocarbon from a slurry in an organic dispersant, contacting the surface of the conformed polymeric halohydrocarbon with a non-penetrating liquid to exert a pressure of at least 250 p.s.i., and heating the compacted polymeric halohydrocarbon to a temperature of about 327° C. to form a sintered article.

References Cited by the Examiner

UNITED STATES PATENTS

| 1,336,180 | 4/1920 | Allen et al. | 264—87 |
| 1,340,308 | 5/1920 | Williams | 264—87 |
| 2,838,800 | 6/1958 | Hertz | 264—178 |
| 2,997,448 | 8/1961 | Hochberg | 264—49 XR |
| 3,003,190 | 10/1961 | Macks | 18—34 |
| 3,015,855 | 1/1962 | Merkel | 264—127 |
| 3,068,513 | 12/1962 | Chaffin | 264—127 |

FOREIGN PATENTS

| 216,064 | 7/1958 | Australia. |

ROBERT F. WHITE, *Primary Examiner.*